R. H. BIGGAR.
PULLEY HUB AND SET COLLAR GUARD.
APPLICATION FILED NOV. 20, 1915.
1,202,022.  Patented Oct. 24, 1916.
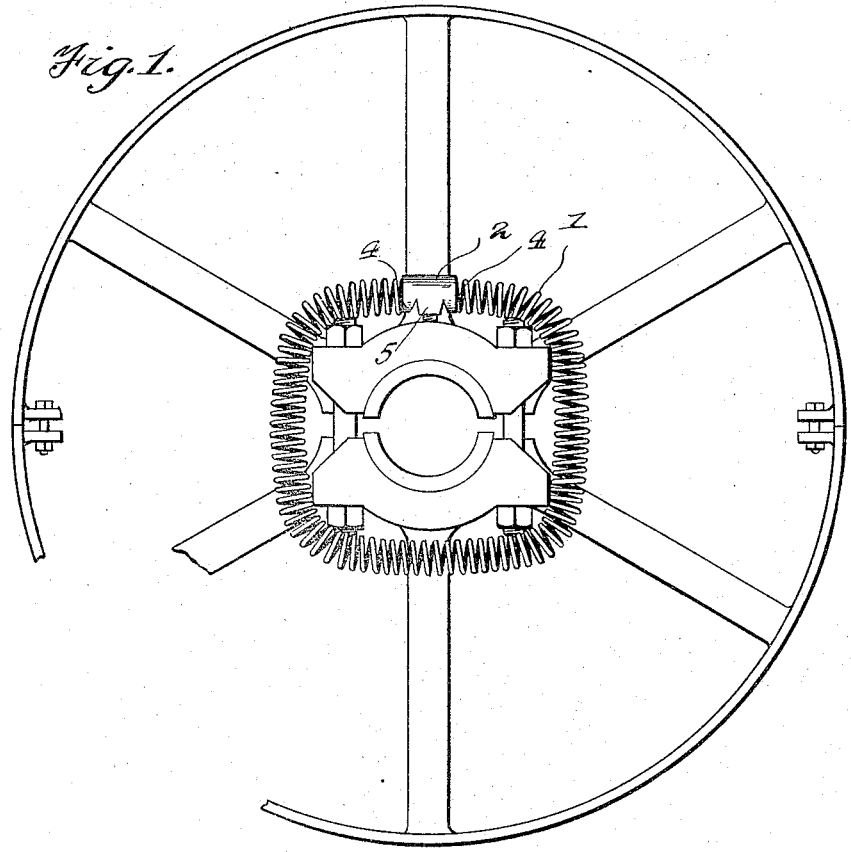
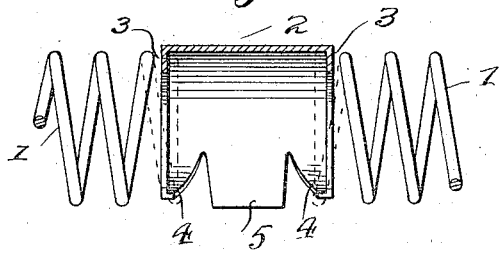
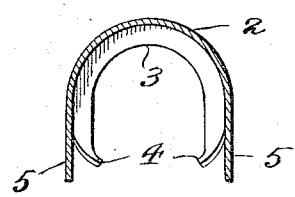
Inventor
R. H. Biggar.
Witnesses
By Victor J. Evans
Attorney

UNITED STATES PATENT OFFICE.

RUTHERFORD H. BIGGAR, OF ONEIDA, NEW YORK.

PULLEY-HUB AND SET-COLLAR GUARD.

1,202,022.  Specification of Letters Patent.  Patented Oct. 24, 1916.

Application filed November 20, 1915. Serial No. 62,673.

*To all whom it may concern:*

Be it known that I, RUTHERFORD H. BIGGAR, a citizen of the United States, residing at Oneida, in the county of Madison and State of New York, have invented new and useful Improvements in Pulley-Hub and Set-Collar Guards, of which the following is a specification.

This invention relates to pulley guards and it consists in the novel features hereinafter described and claimed.

An object of the invention is to provide a guard of simple and durable structure, the parts being so assembled as to permit of the guards being easily and quickly applied to the hub of a pulley or a collar mounted upon a shaft for the purpose of preventing a set screw or any other projecting object carried by the pulley hub or collar from becoming entangled in the clothing of those compelled to be about the shaft or pulley, thereby preventing accidents.

With the above object in view the guard comprises a coil spring adapted to be positioned around the periphery of a pulley hub or the periphery of a collar and having a coupling member which connects the ends of the spring together and which may also serve as a housing for receiving a set screw or other projecting object mounted upon the pulley hub or the collar.

In the accompanying drawing:—Figure 1 is a side elevation of a pulley showing the guard applied. Fig. 2 is a longitudinal sectional view of the coupling of the guard. Fig. 3 is a transverse sectional view of the same.

The guard comprises a coil spring 1 which is adapted to be positioned around the periphery of a pulley hub or the periphery of a collar. A coupling member 2 connects the ends of the said springs together and the said member is in the form of a housing adapted to extend over the set screw of a pulley or a collar or other projecting objects carried by the said parts.

As illustrated in the accompanying drawing the coupling member 2 is formed from sheet metal and is arcuate in transverse section. The said member is provided at its ends with inwardly disposed flanges 3 adapted to engage between the convolutions of the end portions of the spring 1. The said member is provided at its ends with lugs 4 which extend along the inner sides of the convolutions of the spring 1 and the member 2 is provided at its opposite sides with ears 5 adapted to rest at their edges upon the periphery of the pulley hub or the periphery of the collar.

When the device is in position upon a pulley hub or collar the spring 1 bears against the periphery of the hub or collar and the coupling member 2 is disposed over the said screw or other projecting parts carried by the hub or collar and the inner edges of the ears 5 bear against the periphery of the hub or collar, therefore, it will be seen that the set screw or other projecting part is located between the ends of the spring 1 and consequently the guard is prevented from turning with relation to the hub or collar. Also the member 2 completely houses the set screw or other projecting parts and prevents the clothing of an operator from becoming entangled with the same.

From the above description taken in conjunction with the accompanying drawing, it will be seen that a pulley or collar guard of simple and durable structure is provided and that the parts are so arranged as to permit of easy and quick adjustment of the guard upon the periphery of a pulley hub or collar.

Having described the invention what is claimed is:—

1. A pulley guard comprising a coil spring, a coupling member having at its ends inwardly disposed flanges adapted to engage between the convolutions of the spring, said member being adapted to rest over a projecting part of a pulley hub or collar.

2. A pulley guard comprising a coil spring, a coupling member provided at its ends with inwardly disposed flanges adapted to engage the convolutions of the spring, and having lugs at its opposite sides adapted to rest against the periphery of the hub of the pulley.

In testimony whereof I affix my signature in presence of two witnesses.

RUTHERFORD H. BIGGAR.

Witnesses:
J. R. CUMINS,
T. J. CARSON.

Copies of this patent may be obtained for five cents each, by addressing the "Commissioner of Patents, Washington, D. C."